United States Patent [19]

Krishnamurthy

[11] Patent Number: 4,555,495

[45] Date of Patent: Nov. 26, 1985

[54] REACTIVATION OF NOBLE METAL-CONTAINING ZEOLITE CATALYST MATERIALS

[75] Inventor: Sowmithri Krishnamurthy, Cherry Hill, N.J.

[73] Assignee: Mobil Oil Corporation, New York, N.Y.

[21] Appl. No.: 604,268

[22] Filed: Apr. 26, 1984

[51] Int. Cl.$^4$ .................... B01J 29/38; C10G 47/18; C10G 35/095
[52] U.S. Cl. .................... 502/50; 208/111; 208/140; 502/52
[58] Field of Search .................... 502/38, 50, 34, 26, 502/52, 53; 208/140

[56] References Cited

U.S. PATENT DOCUMENTS 3,287,256  11/1966  Young .................... 502/50
4,377,468   3/1983  Pierre et al. .................... 208/111

*Primary Examiner*—P. E. Konopka
*Attorney, Agent, or Firm*—A. J. McKillop; M. G. Gilman; L. P. Hobbes

[57] ABSTRACT

A process is described for rejuvenating a coke-deactivated noble metal-containing zeolite catalyst material which comprises sulfiding the deactivated catalyst material by contacting with a sulfiding agent such as hydrogen sulfide-containing gas, removing coke from the sulfided catalyst by contacting the catalyst with oxygen in the presence of sulfur dioxide, and thereafter reducing the catalyst in the presence of a reducing agent such as hydrogen. The process permits catalyst reactivation by burning off coke from the catalyst while avoiding excessive agglomeration of the noble metals thereon.

19 Claims, No Drawings

REACTIVATION OF NOBLE METAL-CONTAINING ZEOLITE CATALYST MATERIALS

BACKGROUND OF THE INVENTION

1. Field of the Invention

The invention relates to a process of reactivating catalysts. In particular, it relates to the reactivation of noble metal-causing zeolite catalysts which have been deactivated by coke build-up. Catalysts which may be reactivated by the process of the present invention include those that have become deactivated during hydrocarbon hydroprocesses, such as the reforming or catalytic dewaxing of hydrocarbon feedstocks.

2. Discussion of the Prior Art

Reactivation of platinum catalysts utilized in hydrocarbon hydroprocessing procedures such as reforming is known in the art. Processes which utilize chlorine and oxygen in catalyst reactivation are particularly well-known. For example, U.S. Pat. No. 2,906,702 to Brennan et al discloses a method of restoring an alumina-supported platinum catalyst after deactivation occurring during the reforming of hydrocarbons. This method teaches contacting a deactivated platinum-alumina catalyst with a gaseous chlorine, fluorine, or other halogen or halogen-affording substance at an elevated temperature. U.S. Pat. No. 3,134,732 to Kearby et al teaches a method for reactivating noble metal catalyst supported on alumina by contacting the catalyst with halogen-containing gas, stripping excess halogen therefrom, and subjecting the resulting catalyst to a reduction step with a hydrogen-containing gas. In this disclosure, the agglomerated metal is present on the surface of the alumina as small crystallites. It is also known in the art to regenerate noble metal- and platinum group metal-containing zeolite catalysts. Regeneration of noble metal-loaded zeolite catalysts required certain procedural modifications to regain the activity of the metal. U.S. Pat. No. 3,986,982 to Crowson et al treats deactivated platinum group metal-loaded zeolites by contacting them with a stream of an inert gas containing from 0.5 to 20 percent volume of free oxygen and from 5 to 500 ppm volume of chlorine as chlorine, HCl, or an organic chlorine-containing material. The resulting catalyst is purged to remove residual oxygen and chlorine and then reduced in a stream of hydrogen at 200° to 600° C.

The treatment of noble metal-containing catalyst material with sulfur compounds is also known in the art. For example, U.S. Pat. No. 3,661,768 to Davis, Jr., et al. describe a method of regenerating a bimetallic reforming catalyst such as platinum-rhenium on alumina which includes contacting the catalyst with hydrogen sulfide to convert platinum to platinum sulfide. Prior to sulfiding, the catalyst is contacted with chlorine and steam in order to effect chlorination.

However, all of the above treatments require certain precautions owing to the corrosive nature of the halogens ued. In addition, certain halogen materials employed in these processes add significantly to the cost of catalyst regeneration. In order to avoid the drawbacks associated with halogen use, it would be advantageous to reactivate catalysts in the absence of halogens. However, when deactivating coke present on a catalyst material is exposed to an oxidizing atmosphere consisting of oxygen and an inert gas, such as nitrogen, substantially all of the noble metal present on the catalyst becomes catalytically inactive.

SUMMARY OF THE INVENTION

It has now been found that coke-deactivated noble metal-containing zeolite catalyst materials can be reactivated without significant loss of the metal function activity therein. In accordance with the present invention, a deactivated platinum group or noble metal-containing zeolite catalyst material is regenerated by a method which comprises: sulfiding the deactivated catalyst material by contacting it with a sulfiding agent such as hydrogen sulfide in hydrogen under sulfiding conditions, removing deactivating coke by contacting the sulfided catalyst material with oxygen in the presence of sulfur dioxide under oxidizing conditions, and reducing the resulting catalyst material by exposure to a reducing agent such as hydrogen under reducing conditions. The catalyst treated in accordance with the present invention exhibits enhanced activity owing to the burn-off of deactivating coke as well as retention of significant noble metal dispersion.

DESCRIPTION OF THE SPECIFIC EMBODIMENTS

The present invention relates to a process for regenerating an aged noble metal-containing zeolite catalyst material to provide a catalyst material of enhanced activity which retains a substantial portion of its noble metal in a dispersed form. The process comprises sulfiding the aged catalyst, oxidizing the coke on the sulfided catalyst material with oxygen in the presence of sulfur dioxide under suitable oxidizing conditions, and thereafter reducing the catalyst material by contact with hydrogen under suitable reducing conditions.

Hydrogen sulfide is a suitable sulfiding agent for the purposes of the present invention. Preferably, the sulfiding agent is combined with hydrogen to form a mixture containing 0.1 to 10 volume percent hydrogen sulfide, preferably about 1 to 2 volume percent hydrogen sulfide. Suitable conditions for sulfiding include temperatures of about 300° to 500° C., preferably about 350° to 450° C., say about 400° C. Pressures may range from about 1 to 400 psig, preferably about 150 to 250 psig. Preferably, the deactivated catalyst material is exposed to the foregoing sulfiding conditions at least until "breakthrough" of the sulfiding agent is observed at the outlet of the sulfiding vessel, i.e., the sulfiding agent is detected in the sulfiding vessel effluent.

The sulfided catalyst material is treated to burn off deactivating coke materials under controlled oxidizing conditions at moderate temperatures and oxygen concentrations. Suitable oxidizing conditions include temperatures ranging from about 100° to 500° C., preferably about 400° to 450° C., pressures ranging from about 100 to 400 psig, preferably about 150 to 250 psig. It is preferred that the oxidizing conditions be mild enough to prevent any alteration in the crystal structure of the zeolite being treated. Sulfided catalyst material is contacted with a gas stream containing oxygen as well as sulfur dioxide. Generally, the gas stream may contain about 1 to 10 volume percent oxygen and 100 ppm to 2 volume percent sulfur dioxide, preferably 1 to 3 volume percent oxygen and 0.05 to 1 volume percent sulfur dioxide. The presence of sulfur dioxide prevents or reduces agglomeration of the noble metals dispersed throughout the catalyst during the removal of coke from the zeolite catalyst material.

Dispersion of the noble metals can be measured by hydrogen chemisorption, e.g., Temperature Programmed Desorption (TPD) of hydrogen. This technique can indicate the extent of noble metal agglomeration of a catalyst material. Details of this analytical technique may be found in "The Stoichiometry of Hydrogen and CO Chemisorption of Ir/$\gamma$-Al$_2$O$_3$", Vol. 78, Journal of Catalysis, pp. 319–326, Krishnamurthy et al., (1982).

The reducing procedure which follows removal of the coke from the catalyst material utilizes any suitable reducing agent, preferably hydrogen. Reduction of the catalyst material is achieved by contacting it with the reducing agent under suitable reducing conditions. These include temperatures ranging from about 300° to 500° C., preferably about 350° to 450° C. and contact times ranging from about 2 to 10 hours, preferably about 3 to 5 hours. Where the reducing agent is in the gaseous form, e.g., hydrogen, said reduction is carried out at pressures ranging from about 1 to 400 psig, preferably about 150 to 250 psig.

The zeolites which may be rejuvenated by the process of the present invention include large pore zeolites such as Zeolite Y, zeolite beta, ZSM-3, ZSM-4, ZSM-18 and ZSM-20, as well as zeolites having a constraint index of about 1 to 12 and silica to alumina mole ratio greater than about 12. Examples of such materials include ZSM-5, ZSM-11, ZSM-5/ZSM-11 intermediates, ZSM-12, ZSM-23, ZSM-35, ZSM-38, ZSM-48 and other similar materials.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite beta is described in U.S. Pat. No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,234,231, the entire contents of which is incorporated herein by reference.

Particularly preferred zeolites for the purposes of the present invention are those which have high silica-to-alumina mole ratios, e.g. greater than about 20 or even greater than 70 or 100.

The catalyst treated by the process of the present invention contains at least one noble metal such as platinum, palladium, iridium, osmium, rhodium, rhenium and ruthenium in amounts ranging from about 0.1 to 5 weight percent, preferably about 0.3 to 0.9 weight percent. These noble metals are generally associated with and supported on a zeolite catalyst. The process may also be used to regenerate multimetallic catalysts which contain one of the above noble metals and another metal selected from Groups IB, IVB, VIIA, or VIII of the Periodic Table. The zeolite catalyst treated can be binder free or it may contain an inorganic oxide binder such as alumina, silica, silica-alumina, magnesia, titania, zirconia, or thoria.

This invention will be better understood by reference to the following examples.

EXAMPLE 1

10 grams of a catalyst material of zeolite beta comprising, 35 wt.% alumina and 0.59 wt.% platinum was exposed to hydrocarbon conversion conditions resulting in a coke build-up thereon. The deactivated catalyst was regenerated by sulfiding to breakthrough with a mixture of 2 volume percent H$_2$S/98 volume percent H$_2$ at 400° C. The sulfided catalyst was then regenerated by exposure to a gas containing 96.3 volume percent N$_2$, 3 volume percent O$_2$ and 0.7 volume percent SO$_2$ at 400° to 450° C. for 0.5 hours in order to burn off the coke. The resulting catalyst was measured by hydrogen chemisorption for platinum dispersion. The regenerated catalyst had a platinum dispersion of 0.33 compared with a dispersion of 0.57 for fresh catalyst.

EXAMPLE 2

A 10 gm sample of the coked catalyst of Example 1 was regenerated by contact with a mixture containing 97 volume percent N$_2$ and 3 volume percent O$_2$ at 400° to 450° C. to achieve coke burn-off. The regenerated catalyst was thereafter reduced for one hour at 450° C. in hydrogen. Platinum dispersion as measured by hydrogen chemisorption was 0.

A comparison of Examples 1 and 2 indicates that the reactivation process of the present invention is effective in retaining a significant portion of the initial Pt dispersion of a catalyst which would otherwise be lost by conventional regeneration treatment.

It is claimed:

1. A process for regenerating a coke-deactivated noble metal-containing zeolite catalyst material containing about 0.1 to 5 weight percent noble metal, which comprises: sulfiding said deactivated catalyst material by contact with a hydrogen sulfide-containing gas at temperatures ranging from about 300° C. to 500° C., pressures ranging from about 1 to 500 psig, in the presence of a hydrogen sulfide-hydrogen mixture containing about 0.1 to 10 volume percent hydrogen sulfide, removing coke from the sulfided catalyst by contacting said catalyst with oxygen in the presence of sulfur dioxide under oxidizing conditions, wherein said oxidizing conditions include temperatures ranging from about 100° to 500° C., pressures ranging from about 100 to 400 psig, and exposure to a gas stream containing about 100 ppm to 2 volume percent $SO_2$ and about 1 to 10 volume percent $O_2$, and exposing the resulting catalyst material to hydrogen under reducing conditions comprising temperatures ranging from about 300° to 500° C., pressures ranging from about 100 to 400 psig, and contact times ranging from about 2 to 10 hours.

2. The process of claim 1 wherein said sulfiding temperatures range from about 350° to 450° C., said sulfiding pressures range from about 150 to 250 psig and said mixture contains about 2 volume percent hydrogen sulfide.

3. The process of claim 1 wherein said oxidizing temperatures range from about 400° to 450° C., and said oxidizing gas stream contains about 0.05 to 1 volume percent sulfur dioxide and about 1 to 3 volume percent oxygen.

4. The process of claim 1 wherein said reducing temperatures range from about 350° to 450° C., said reducing pressures range from about 150 to 250 psig, and said reducing contact time ranges from about 3 to 5 hrs.

5. The process of claim 1 wherein the framework silica to alumina mole ratio of said zeolite is at least about 20.

6. The process of claim 1 wherein the framework silica to alumina mole ratio of said zeolite is at least about 70.

7. The process of claim 1 wherein the framework silica to alumina mole ratio of said zeolite is at least about 100.

8. The process of claim 1 wherein said catalyst material contains a zeolite having a constraint index ranging from about 1 to 12 and a silica to alumina mole ratio of at least about 12.

9. The process of claim 1 wherein said catalyst material contains a zeolite selected from the group consisting of ZSM-5, ZSM-5/ZSM-11 intermediate, ZSM-11, ZSM-12, ZSM-22, ZSM-23, ZSM-35, ZSM-38 and ZSM-48.

10. The process of claim 1 wherein said catalyst material contains a zeolite selected from the group consisting of zeolite beta, Zeolite Y, ZSM-3, ZSM-4, ZSM-18 and ZSM-20.

11. The process of claim 1 wherein said zeolite is zeolite beta.

12. The process of claim 1 wherein said zeolite is ZSM-5.

13. The process of claim 1 wherein said zeolite contains a metal selected from the group consisting of platinum, palladium, iridium, osmium, rhodium, rhenium and ruthenium.

14. The process of claim 13 wherein said zeolite catalyst contains about 0.3 to 0.9 weight percent platinum group metal.

15. The process of claim 1 wherein said catalyst contains an inorganic oxide binder.

16. The process of claim 14 wherein said binder is selected from the group consisting of alumina, silica, silica-alumina, magnesia, titania, zirconia and thoria.

17. The process of claim 14 wherein said binder is alumina.

18. The process of claim 14 wherein said binder is silica.

19. The process of claim 14 wherein said binder is silica-alumina.

* * * * *

UNITED STATES PATENT AND TRADEMARK OFFICE
CERTIFICATE OF CORRECTION

PATENT NO. : 4,555,495

DATED : November 26, 1985

INVENTOR(S) : Sowmithri Krishnamurthy

It is certified that error appears in the above-identified patent and that said Letters Patent is hereby corrected as shown below:

Column 1, line 11, "metal-causing" should read

-- metal-containing --.

Signed and Sealed this

Twenty-seventh Day of May 1986

[SEAL]

Attest:

DONALD J. QUIGG

Attesting Officer

Commissioner of Patents and Trademarks